(12) United States Patent
Kirkpatrick, Jr. et al.

(10) Patent No.: US 9,567,164 B2
(45) Date of Patent: Feb. 14, 2017

(54) CONVEYOR SYSTEM WITH TRANSFER BELTS

(71) Applicant: Laitram, L.L.C., Harahan, LA (US)

(72) Inventors: Paul Edward Kirkpatrick, Jr., Glenwood, MD (US); Angela Longo Marshall, Harahan, LA (US); John F. Landrum, New Orleans, LA (US); Robert L. Rosen, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/689,296

(22) Filed: Apr. 17, 2015

(65) Prior Publication Data

US 2016/0304293 A1 Oct. 20, 2016

(51) Int. Cl.
*B65G 15/24* (2006.01)
*B65G 47/52* (2006.01)
*B65G 23/16* (2006.01)
*B65G 37/00* (2006.01)

(52) U.S. Cl.
CPC ............ *B65G 47/52* (2013.01); *B65G 23/16* (2013.01); *B65G 37/00* (2013.01)

(58) Field of Classification Search
CPC ......... B65G 23/16; B65G 37/00; B65G 15/10; B65G 15/105; B65G 15/12; B65G 47/52
USPC ........................ 198/606, 817, 833
See application file for complete search history.

(56) References Cited

U.S. PATENT DOCUMENTS

| | | | |
|---|---|---|---|
| 2,673,640 A * | 3/1954 | Temple | A21B 3/07 198/592 |
| 3,068,989 A * | 12/1962 | Packman | A21C 15/00 198/382 |
| 3,517,925 A * | 6/1970 | Hutz | B27N 3/22 198/586 |
| 4,044,891 A * | 8/1977 | Pynsky | B07C 5/02 198/339.1 |
| 4,771,877 A * | 9/1988 | Langen | B65G 47/31 198/461.3 |
| 5,303,817 A | 4/1994 | Kissee | |
| 5,411,279 A | 5/1995 | Magid | |
| 5,415,274 A | 5/1995 | Krismanth et al. | |
| 5,630,500 A | 5/1997 | Conrad | |
| 6,186,732 B1 | 2/2001 | Brown et al. | |
| 6,536,583 B2 | 3/2003 | Luigi | |
| 6,868,747 B2 | 3/2005 | Goser et al. | |

(Continued)

OTHER PUBLICATIONS

International Search Report and Written Opinion of the International Searching Authority, PCTUS2016/022079, mailed Jun. 23, 2016, Korean Intellectual Property Office, Daejeon, Republic of Korea.

*Primary Examiner* — William R Harp
(74) *Attorney, Agent, or Firm* — James T. Cronvich

(57) ABSTRACT

A conveyor for transferring articles off the end of a conveyor belt onto a discharge conveyor. The conveyor comprises a conveyor belt overlain by belt strands along a carryway. The belt strands are received in recesses below the conveying surface of the conveyor belt. The conveyor belt travels an inner circuit inside an outer circuit encircled by the belt strands. The outer circuit diverges from the inner circuit at an end of the carryway. The belt strands extend the carryway and strip articles from the conveyor belt to transfer them to a downstream discharge conveyor or receive articles from an upstream infeed conveyor.

22 Claims, 4 Drawing Sheets

(56) References Cited

U.S. PATENT DOCUMENTS

| | | | |
|---|---|---|---|
| 7,258,227 | B2 | 8/2007 | Rettore et al. |
| 7,681,717 | B2 * | 3/2010 | DeGroot ................ B65G 15/30 198/832 |
| 7,874,418 | B2 | 1/2011 | Steinstrater et al. |
| 8,074,785 | B2 * | 12/2011 | Twiste ................... B65G 19/02 186/68 |
| 8,453,825 | B2 | 6/2013 | Wunsch |
| 8,556,181 | B2 * | 10/2013 | Twiste ................... A47F 9/048 235/375 |
| 2002/0092737 | A1 | 7/2002 | Messick, Jr. |
| 2010/0084248 | A1 | 4/2010 | Leger |
| 2011/0132725 | A1 | 6/2011 | Marshall et al. |

\* cited by examiner

CONVEYOR SYSTEM WITH TRANSFER BELTS

BACKGROUND

The invention relates generally to power-driven conveyors and more particularly to conveyors having transfer belts stripping articles from a conveyor belt.

When a conveyor belt is used to discharge articles off its end and onto a discharge conveyor, a stationary transfer plate positioned in the gap between the two conveyors is commonly used. Belt articles can become stranded on the transfer plate when the conveyor belt stops or has no articles to discharge. Sometimes it is possible to discharge articles from a conveyor belt directly to a downstream conveyor without an intervening transfer plate in the gap. But the gap has to be small enough to accommodate the footprints of the articles being discharged without tripping them. When the conveyor belt has a long pitch or has to negotiate large-diameter sprockets at its discharge end, the gap is correspondingly large and can cause articles with small footprints or small bottom features to trip, skew, or strand.

SUMMARY

One version of a conveyor embodying features of the invention comprises a conveyor belt having an outer article-supporting surface and forming an inner belt loop that includes an upper carryway segment along which the conveyor belt advances in the conveying direction. A plurality of parallel belt strands form an outer belt loop encircling the inner belt loop. The belt strands are recessed below the outer article-supporting surface of the conveyor belt on the upper carryway segment. In that way articles are conveyed on the article-supporting surface of the conveyor belt on the carryway segment.

Another version comprises a carryway extending longitudinally in a conveying direction from an upstream end to a downstream end and a conveyor belt advancing in the conveying direction along a portion of the carryway and dropping below the carryway at a belt-diverge position short of the downstream end. The conveyor belt has outer article-supporting structure defining a conveying plane on which conveyed articles sit and a plurality of longitudinal lanes recessed below the conveying plane. Parallel belt strands received in the longitudinal lanes advance in the conveying direction along the carryway to the downstream end. Conveyed articles transfer from the conveyor belt to the plurality of belt strands at the belt-diverge position of the carryway.

Yet another version comprises a first reversing element having an outer periphery and a second reversing element spaced apart from the first reversing element and also having an outer periphery. A conveyor belt has an outer conveying surface and forms an inner belt loop. The inner loop has an upper carryway segment that extends in a conveying direction from the first reversing element at a first end of the carryway segment to the second reversing element at a second end of the carryway segment and a lower return segment between the second reversing element and the first reversing element. A first transition segment of the loop extends around a portion of the periphery of the first reversing element between the return segment and the carryway segment, and a second transition segment extends around a portion of the periphery of the second reversing element between the carryway segment and the return segment. A third reversing element having an outer periphery is disposed beyond the second end of the carryway segment in the conveying direction or beyond the first end of the carryway segment in a direction opposite to the conveying direction. Parallel belt strands advance along the carryway segment in the conveying direction and form an outer belt loop having a third transition segment around a portion of the periphery of the third reversing element. Each of the strands advances along the length of the carryway segment and around the third reversing element on the third transition segment. The reversing distance of the third reversing element is less than the reversing distance of the second reversing element.

DETAILED DESCRIPTION

Figure 1:
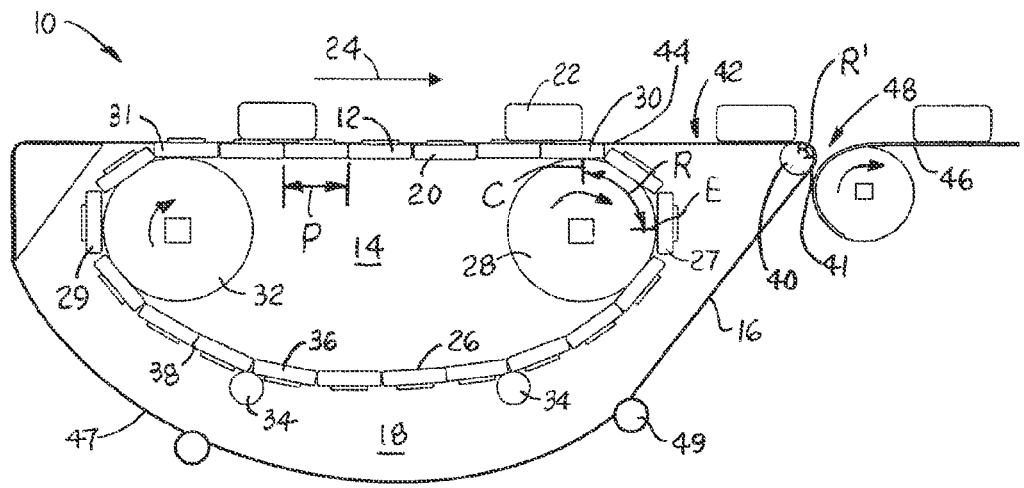
FIG. 1 is a side elevation view of a transfer conveyor embodying features of the invention.

One version of a transfer conveyor embodying features of the invention is shown in FIG. 1. The conveyor 10 comprises a primary conveyor belt 12 forming an inner belt loop 14, or circuit, and a secondary belt conveyor 16 forming an outer belt loop 18, or circuit, around the inner belt loop. The inner conveyor belt loop 14 has an upper carryway segment 20 forming a portion of the conveyer's carryway along which articles 22 are conveyed in a conveying direction 24. The primary conveyor belt 12 transitions from the upper carryway segment 20 of the inner belt loop 14 to a lower return segment 26 on a transition segment 27 around a reversing element 28 at a downstream end 30 of the carryway segment. The inner belt loop 14 further includes another transition segment 29 around a reversing element 32 at an upstream end 31 of the carryway segment 20. The primary conveyor belt 12 reverses direction from the lower return segment 26 to the upper carryway segment 20 on the upstream transition segment 29. The downstream reversing element 28 could be a motor-driven sprocket or pulley set or a motorized drum, for example. The upstream reversing element 32 could be an idle sprocket or pulley set or a roller or a shoe, for example. Or the belt 12 could be driven in the return segment 26, and the two reversing elements 28, 32 could be idlers. Rollers 34 or shoes support the primary conveyor belt 12 in the primary return segment 26.

The primary conveyor belt 12 is shown in FIG. 1 as a modular conveyor belt constructed of a series of rows of one or more rigid belt modules 36, or slats, linked together at hinge joints 38 between adjacent belt rows. The modular conveyor belt 12 has a pitch P, defined by the distance between consecutive hinge joints 38. Along with other factors, the pitch P of the rigid belt modules sets a lower limit on the diameter of the reversing elements the belt can be used with effectively. Modular belts constructed of rigid modules with long pitches require large-diameter reversing elements. Larger reversing elements increase the reversing distance R, which is measured along the transition segment around the reversing element 28 from a tangent point C, at which the loop diverges from the carryway segment, to a tangent point E, at which the loop first becomes perpendicular to the carryway segment. Thus, the tangent lines at the points C and E are perpendicular to each other. Although the thickness, pitch, and flexibility of the conveyor belt wrapping around the reversing element also affect the minimum spacing between end-to-end conveyors, for the purposes of this application, the reversing distance R is defined as the distance measured along the outer periphery of the reversing element. So the reversing distance as defined in this application is a characteristic of the reversing element's peripheral geometry and is independent of the belt. For example, a reversing element with a circular periphery has a reversing distance $R=\pi r/2$, where r is the radius, i.e., half the outer diameter, of the reversing element. The reversing distance R affects how close one conveyor can be spaced end to end to another conveyor. A greater reversing distance means a larger gap between adjacent end-to-end conveyors.

To minimize that gap, the secondary belt conveyor 16 forming the outer loop 18 comprises a plurality of parallel belt strands that are flexible enough to wrap around a small-diameter reversing element 40, such as a static nose bar or powered rollers or pulleys, on a transition segment 41 that turns much tighter than the primary belt's transition segment 27. Examples of such flexible belt strands are narrow belts, narrow chains, V belts, cable belts, toothed timing belts, link belts such as the POWERTWISTPLUS® linked V-belts manufactured and sold by Fenner Drives, Inc., Manheim, Pa., U.S.A, and other strands of material. The belt strands 16 forming the outer loop are supported in a secondary return segment 47 by rollers 49 or shoes. The small-diameter reversing element 40 has a much smaller reversing distance R' than that of the primary belt's reversing element 28. The small-diameter reversing element 40 is positioned downstream of the carryway segment 20 of the primary belt loop 14. The secondary belt strands 16 ride in the conveying direction 24 along the carryway segment 20 in longitudinal lanes on the top side of the primary conveyor belt 12. The belt strands 16 form a carryway extension 42 from a belt-diverge position 44, at which the primary conveyor belt 12 diverges from the belt strands 16, to the outer belt loop's downstream reversing element 40. The articles 22 riding atop the primary conveyor belt 12 transfer onto the belt strands 16 at the belt-diverge position 44. The small-diameter reversing element 40 allows a discharge conveyor 46 to be positioned close to the belt strands 16 at the downstream end of the transfer conveyor 10 across a small gap 48 for a smooth transfer of the articles 22 to the discharge conveyor. That gap 48 is much smaller than the gap that would be required to separate the primary conveyor belt 12 itself from the discharge conveyor 46 without the intervening transfer belt strands 16.

Figure 2:
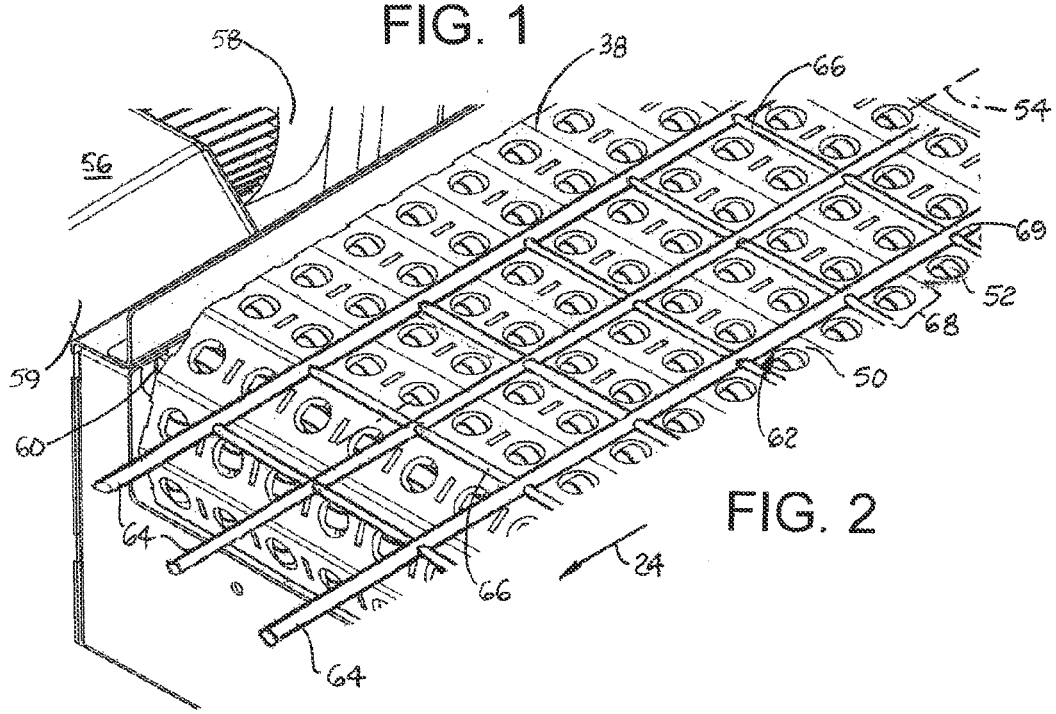
FIG. 2 is an isometric view of a portion of the carryway of a conveyor as in FIG. 1.

One version of the belts depicted in FIG. 1 is shown in FIG. 2. The primary conveyor belt 50 is a modular plastic conveyor belt with embedded rollers 52 arranged to rotate on axes 54 parallel to the conveying direction 24. The primary conveyor belt 50 is driven by a drive 56 including a motor 58 and gearbox 59 connected to a drive shaft 60 on which reversing elements in the form of sprockets are mounted. The article-supporting rollers 52 are arranged in longitudinal columns. A longitudinal lane 62 is formed between columns. Flexible belt strands 64 are received in the longitudinal lanes 62. In this example the belt strands 64 are joined by connecting links 66 extending perpendicular to the conveying direction 24 along the hinge joints 38 between adjacent belt rows 68 to form a mesh belt 69 providing additional product support. The apexes of the connecting links 66 and the belt strands 64 lie below the apexes of the article-supporting belt rollers 52 along the primary belt's carryway segment. At the end of the primary conveyor belt's carryway segment, the belt strands 64 strip conveyed articles from the conveyor belt 50.

Figure 3:
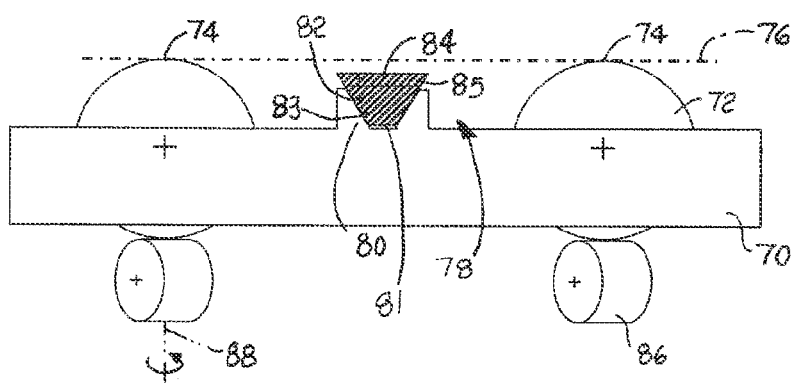
FIG. 3 is a cross-sectional end view of a portion of another version of a transfer conveyor embodying features of the invention.

Another version of the belts of FIG. 1 is shown in FIG. 3. In this version the primary conveyor belt 70, a portion of the width of which is shown, has longitudinal columns of article-supporting rollers 72, which extend through the thickness of the belt. Apexes 74 of the rollers define a conveying plane 76. In a recessed longitudinal lane 78 between the columns of rollers 72, drive structure 80 forming a V groove 81 is formed. A belt strand in the form of a V belt 82 is received in the groove 81 and is frictionally driven by the primary conveyor belt 70 along the carryway. The walls of the drive structure 80 forming the groove also help track the strand in its lane. The top surface 84 of the V-belt strand 82 lies below the conveying plane 76 and out of contact with the conveyed articles. Articles supported atop the rollers 72 can be diverted toward or off one side of the belt 70 or the other by obliquely oriented actuating rollers 86 in contact with the belt rollers 72 below the carryway segment of the conveyor belt 70. The belt rollers 72 roll on the oblique actuating rollers 86 as the belt advances in the conveying direction. The actuating rollers 86 swivel about a vertical 88 axis to change the divert direction from one side of the belt to the other. The V belt 82 can be made of two materials with, for example, a lower driving portion 83 made of a high-friction material, such as a rubber or elastomer, to better drive the primary conveyor belt 70 and an upper article-contacting portion 85 made of a low-friction material to allow non-rigid articles to move smoothly across the transfers without dragging.

Figure 4:
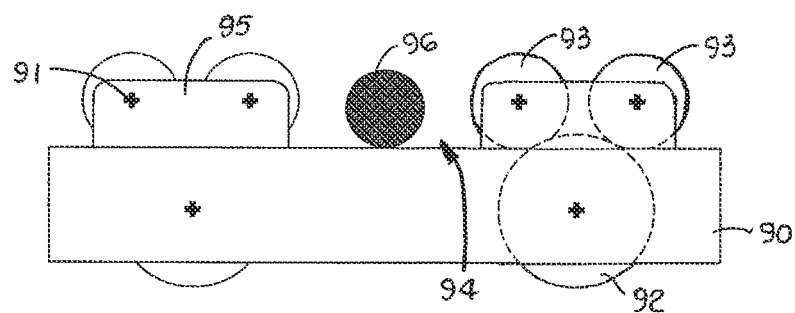
FIG. 4 is a cross-sectional end view of a portion of yet another version of a transfer conveyor embodying features of the invention.
Figure 7:
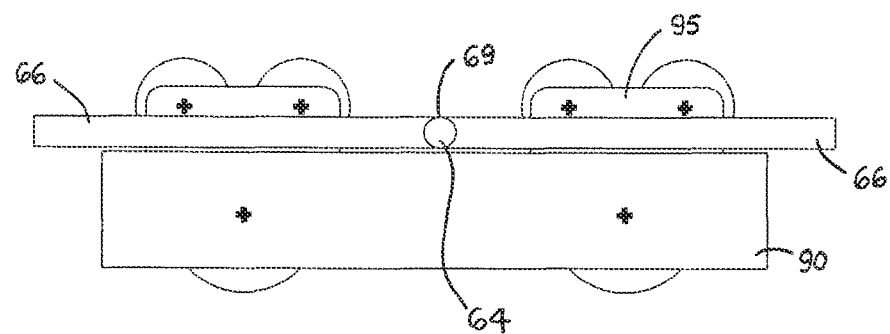
FIG. 7 is a cross-sectional end view of the primary conveyor belt of FIG. 4 driven by a secondary mesh belt.

In FIG. 4 the primary conveyor belt 90 has a stacked-roller configuration in which a lower roller 92 engages a pair of article-supporting upper rollers 93 rotatable on axles 91 supported at their ends in supports 95 extending upward from the conveyor belt 90. The lower roller 92 extends below the belt 90 so that the rollers can be actuated by actuating rollers 86 to divert articles as in FIG. 3. The sets of three rollers 92, 93 are arranged in longitudinal columns flanking recessed longitudinal lanes 94. A belt strand 96 is received in each of the longitudinal lanes 94. In this example the belt strand 96 is shown as a cable belt. The apex of the cable belt 96 lies below the apexes of the article-supporting rollers 93. FIG. 7 shows the stacked-roller conveyor belt 90 with the secondary mesh belt 69 of FIG. 2. The mesh belt 69 lies below the apexes of the top rollers 93. The roller supports 95 upstanding from the conveyor belt 90 also serve as drive structure that pushes against the transverse connecting links 66 to drive the mesh belt 69. The longitudinal strands 64 and the lateral connecting links 66 of the mesh belt 69 also partly fill the longitudinal and lateral spaces between the sets of belt rollers.

Figure 5:
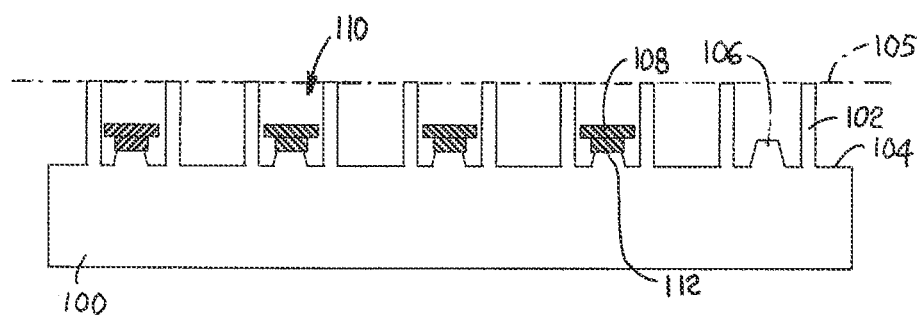
FIG. 5 is a cross-sectional end view of a portion of a fourth version of a transfer conveyor embodying features of the invention.

The primary conveyor belt 100 in FIG. 5 has longitudinal columns of ribs 102 standing up from its top side 104. The tops of the ribs 102 define a conveying plane 105. Articles conveyed by the belt sit atop the ribs 102 along the carryway. Between laterally consecutive columns of ribs 102, drive protrusions 106 or teeth are formed at regular longitudinal intervals. Belt strands in the form of toothed belts 108, such as timing belts, are received in recesses 110 between consecutive columns of ribs 102. The drive protrusions 106 of the conveyor belt 100 engage drive-receiving surfaces of teeth 112 on the bottom side of the toothed belts 108 to drive the belt strands along the carryway in the conveying directions.

Figure 6:
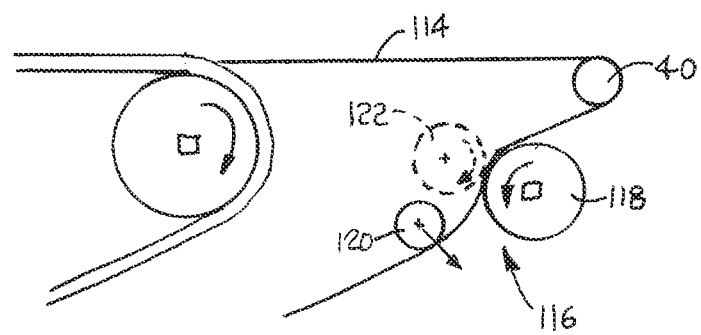
FIG. 6 is a side elevation view of the discharge end of a transfer conveyor as in FIG. 1, but with a separately driven transfer belt.
Figure 8:
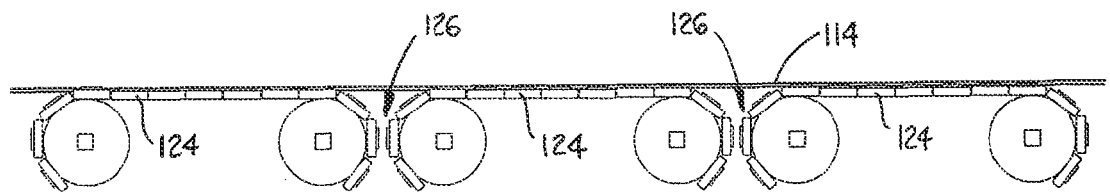
FIG. 8 is a partial side elevation view of a single set of secondary belt strands extending over a series of primary conveyor belts as in FIG. 1.

Besides being driven by the primary conveyor belt frictionally as in FIG. 3 or positively as in FIG. 5, the belt strands 114 can be driven by their own drive 116 as shown in FIG. 6. In this example, the belt strands are driven by a drive pulley 118 disposed below the reversing element 40 and inward away from the discharge conveyor. A snub roller 120 applies tension to the belt strand 114 and increases the amount of wrap around the drive pulley 118. A pinch-roller system 122, 118 could be used instead to drive the belt strands 114. The belt strands can even be overdriven at a higher speed than the primary conveyor belt to provide tension in the carryway. And FIG. 8 shows a single set of secondary belt strands 114 extending along a series of primary conveyor belts 124. The belt strands 114 bridge consecutive end-to-end primary conveyor belts 124 and transfer articles across the intervening gaps 126.

Figure 9A:
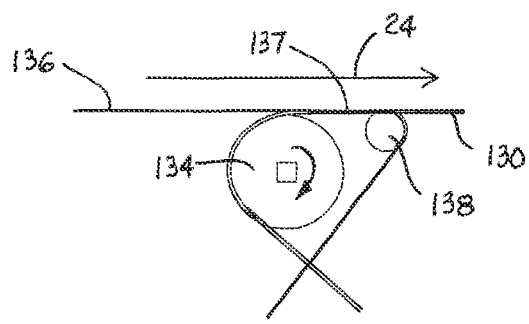
FIGS. 9A and 9B are side elevation and top plan views of the transfer portion of another version of a transfer conveyor embodying features of the invention.
Figure 9B:
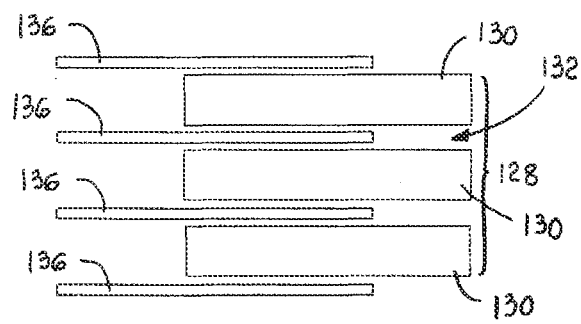

FIGS. 9A and 9B show an article transfer to a downstream discharge conveyor 128 constructed of parallel belts 130 separated by spaces 132. The downstream belts 130 reverse direction from the downstream returnway to the downstream carryway about a reversing element 134, such as a set of sprockets or pulleys. Parallel belt strands 136 forming the outer belt loop of the upstream conveyor extend into the spaces 132 between consecutive downstream belts 130 in an interleaved arrangement with the belt strands overlapping the downstream belts in the conveying direction 24. The top article-conveying surfaces 137 of the belt strands 136 and the downstream belts 130 are generally coplanar. The flexible belt strands 136 transition from the upstream carryway to the upstream returnway around a reversing element 138 that is positioned downstream of the downstream belt's reversing element 134. So articles conveyed in the conveying direction 24 atop the belt strands transfer directly to the parallel downstream belts without having to cross a gap between the upstream and downstream conveyors.

Figure 10:
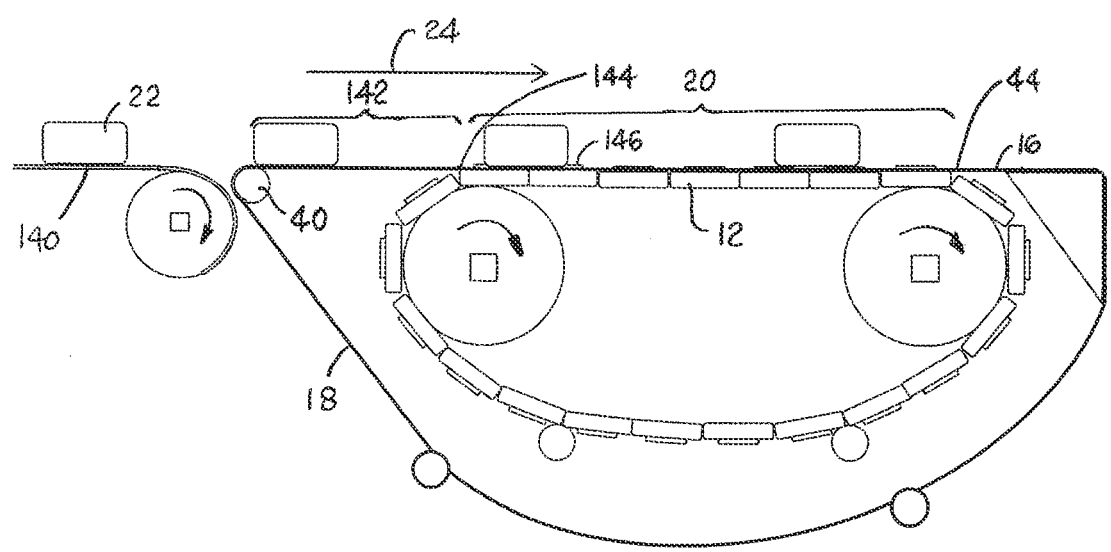
FIG. 10 is a side elevation view of a version of a transfer conveyor with belt strands extending upstream to transfer articles from an infeed conveyor.

The transfer conveyor can be arranged to receive articles from an upstream infeed conveyor 140 as shown in FIG. 10. The arrangement is the reverse of that shown in FIG. 1. In this version the outer belt loop 18 of the secondary belt conveyor 16 forms a carryway extension 142 that extends upstream from the upper carryway segment 20 to the small-diameter reversing element 40 near the discharge end of the infeed conveyor 140. Conveyed articles are transferred from the belt strands 16 to the primary conveyor belt 12 at a belt-converge position 144 at which the conveyor belt merges with the belt strands at the upstream end of the carryway segment 20. The belt-converge position is upstream of the belt-diverge position 44 at the downstream end of the carryway. On the carryway segment 20 the belt strands reside in longitudinal recesses below the plane of the outer article-supporting surface 146 of the conveyor belt so that articles are conveyed atop the primary conveyor belt 12.

The outer belt loop can be arranged with small-diameter reversing elements at the upstream and downstream ends of carryway extensions from each end of the primary belt's carryway segment for bidirectional operation in which the conveying direction is reversible.

Although features of the invention have been described with respect to various versions, other versions are possible. For example, the belt strands could include holes that receive drive pins upstanding from the primary conveyor belt in a traction-feed drive engagement. As another example, the reversing element for the transfer belt strands does not have to be a cylindrical bar; it could be any sort of structure that allows the belt strands to transition from an upper carryway to a lower return on a tight radius. And the varieties of structures (e.g., rollers, stacked rollers, ribs) shown protruding up from the top sides of the conveyor belts are merely examples of article-supporting belt structure. Although the primary conveyor belt was described as a modular conveyor belt made of rigid, hinged modules, that was only an example. Other conveyor belts, such hingeless, flexible conveyor belts, can serve as the primary belt. And even though FIG. 1 shows the primary and secondary conveyor belts with individual return segments, it would be possible in certain configurations for both to be supported by return rollers or shoes in the same return path, in which the primary conveyor belt is in contact with the secondary belt strands. So, as these few examples suggest, the scope of the claims is not meant to be limited to the specific versions used in this description.

What is claimed is:

1. A conveyor comprising:
a conveyor belt having an outer article-supporting surface and forming an inner belt loop that includes an upper carryway segment along which the conveyor belt advances in the conveying direction;
a plurality of parallel belt strands forming an outer belt loop encircling the inner belt loop;
wherein the plurality of belt strands are recessed below the outer article-supporting surface of the conveyor belt on the upper carryway segment so that articles are conveyed on the article-supporting surface of the conveyor belt on the carryway segment; and
wherein the outer article-supporting surface defines a conveying plane on which conveyed articles sit and a plurality of longitudinal lanes recessed below the conveying plane and wherein the plurality of belt strands are received in the longitudinal lanes.

2. A conveyor as in claim 1 wherein the outer belt loop forms a carryway extension that extends from the upper carryway segment in the conveying direction, wherein articles are conveyed on the plurality of belt strands on the carryway extension.

3. A conveyor as in claim 2 further comprising a nose bar at an end of the carryway extension about which the plurality of belt strands change direction.

4. A conveyor as in claim 2 further comprising one or more parallel downstream belts interleaved with the plurality of belt strands on the carryway extension to receive conveyed articles from the plurality of belt strands or one or more parallel upstream belts interleaved with the plurality of belt strands on the carryway extension to feed conveyed articles to the plurality of belt strands.

5. A conveyor as in claim 2 wherein the carryway extension extends from the upper carryway segment in the conveying direction or opposite the conveying direction or both.

6. A conveyor as in claim 1 wherein the belt strands are selected from the group consisting of cable belts, V belts, link belts, and toothed belts.

7. A conveyor as in claim 1 comprising a first drive driving the conveyor belt and a second drive driving the plurality of belt strands.

8. A conveyor as in claim 1 further comprising connecting links extending across the width of the conveyor belt on the upper carryway segment of the conveyor belt loop and connected to the plurality of belt strands to form a mesh.

9. A conveyor as in claim 8 wherein the conveyor belt further includes drive structure upstanding from the conveyor belt and pushing against the connecting links to drive the plurality of belt strands in the conveying direction.

10. A conveyor as in claim 1 wherein the outer article-supporting surface comprises a plurality of longitudinal columns of article-supporting rollers having apexes defining the conveying plane.

11. A conveyor as in claim 10 wherein the conveyor belt further includes drive structure in the longitudinal lanes engaging the plurality of belt strands along the upper carryway segment and driving the plurality of belt strands in the conveying direction.

12. A conveyor as in claim 11 wherein the drive structure frictionally drives the plurality of belt strands along the upper carryway segment in the conveying direction.

13. A conveyor as in claim 11 wherein the drive structure includes drive protrusions engaging drive-receiving surfaces in the plurality of belt strands to drive the plurality of belt strands along the upper carryway segment in the conveying direction.

14. A conveyor as in claim 1 wherein the belt strands have an upper portion made of a low-friction material and a lower portion made of a high-friction material.

15. A conveyor as in claim 1 comprising a plurality of the conveyor belts arranged end to end in the conveying direction, each forming an individual inner conveyor belt loop, and wherein the plurality of belt strands form a single outer strand loop encompassing the individual inner conveyor belt loops.

16. A conveyor as in claim 1 wherein the conveying direction is reversible.

17. A conveyor as in claim 1 wherein the conveyor belt includes a series of rows of rigid belt modules linked together at hinge joints and wherein the parallel belt strands are made of a flexible material.

18. A conveyor comprising:
a carryway extending longitudinally in a conveying direction from an upstream end to a downstream end;
a conveyor belt advancing in the conveying direction along a portion of the carryway and dropping below the carryway at a belt-diverge position short of the downstream end, the conveyor belt having outer article-supporting structure defining a conveying plane on which conveyed articles sit and a plurality of longitudinal lanes recessed below the conveying plane;
a plurality of parallel belt strands received in the longitudinal lanes and advancing in the conveying direction along the carryway to the downstream end;
wherein conveyed articles transfer from the conveyor belt to the plurality of belt strands at the belt-diverge position of the carryway.

19. A conveyor as in claim 18 wherein the conveyor belt enters the carryway at a belt-converge position upstream of the belt-diverge position and conveyed articles transfer from the plurality of belt strands to the conveyor belt at the belt-converge position of the carryway.

20. A conveyor as in claim 18 comprising a plurality of the conveyor belts arranged end to end in the conveying direction across intervening gaps and wherein the plurality of belt strands bridge the intervening gaps.

21. A conveyor as in claim 18 further comprising one or more parallel downstream belts interleaved with the plurality of parallel belt strands to receive conveyed articles from the plurality of belt strands.

22. A conveyor comprising:
a first reversing element having an outer periphery;
a second reversing element spaced apart from the first reversing element and having an outer periphery;
a conveyor belt having an outer conveying surface and forming an inner belt loop having:
an upper carryway segment extending in a conveying direction from the first reversing element at a first end of the carryway segment to the second reversing element at a second end of the carryway segment;
a lower return segment between the second reversing element and the first reversing element;
a first transition segment around a portion of the periphery of the first reversing element between the return segment and the carryway segment;
a second transition segment around a portion of the periphery of the second reversing element between the carryway segment and the return segment;
a third reversing element disposed beyond the second end of the carryway segment in the conveying direction or beyond the first end of the carryway segment in a direction opposite to the conveying direction and having an outer periphery;
a plurality of parallel belt strands advancing along the carryway segment in the conveying direction and forming an outer belt loop having a third transition segment around a portion of the periphery of the third reversing element, wherein each of the strands advances along the length of the carryway segment and around the third reversing element on the third transition segment;
wherein the reversing distance of the third reversing element is less than the reversing distance of the second reversing element; and
wherein the outer conveying surface of the conveyor belt defines a conveying plane on which conveyed articles sit and a plurality of longitudinal lanes recessed below the conveying plane and wherein the plurality of parallel belt strands are received in the longitudinal lanes.

* * * * *